US008645055B2

(12) United States Patent
Chen et al.

(10) Patent No.: US 8,645,055 B2
(45) Date of Patent: Feb. 4, 2014

(54) METHOD AND APPARATUS FOR PROVIDING GEOSPATIAL AND TEMPORAL NAVIGATION

(75) Inventors: Yih-Farn Chen, Bridgewater, NJ (US); Giuseppe Di Fabrizio, Florham Park, NJ (US); David Gibbon, Lincroft, NJ (US); Rittwik Jana, Parsippany, NJ (US); Serban Jora, Roanoke, VA (US); Bernard S. Renger, New Providence, NJ (US); Bin Wei, Basking Ridge, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1038 days.

(21) Appl. No.: 11/942,407

(22) Filed: Nov. 19, 2007

(65) Prior Publication Data

US 2008/0125969 A1  May 29, 2008

Related U.S. Application Data

(60) Provisional application No. 60/860,243, filed on Nov. 20, 2006.

(51) Int. Cl.
G01C 21/00 (2006.01)

(52) U.S. Cl.
USPC ............. 701/408; 701/532; 701/537; 725/39; 725/40; 725/41; 725/44; 725/46

(58) Field of Classification Search
USPC .......... 701/206, 208, 211; 725/39, 40, 41, 44, 725/46, 48, 50, 52; 707/918, 920, 921
See application file for complete search history.

(56) References Cited

U.S. PATENT DOCUMENTS

| | | | | |
|---|---|---|---|---|
| 5,671,342 A | * | 9/1997 | Millier et al. | 345/418 |
| 7,188,085 B2 | * | 3/2007 | Pelletier | 705/50 |
| 7,257,589 B1 | * | 8/2007 | Hull et al. | 707/608 |
| 2002/0112237 A1 | * | 8/2002 | Kelts | 725/39 |
| 2006/0029296 A1 | * | 2/2006 | King et al. | 382/313 |
| 2008/0125969 A1 | * | 5/2008 | Chen et al. | 701/211 |
| 2010/0070613 A1 | * | 3/2010 | Chen et al. | 709/219 |

FOREIGN PATENT DOCUMENTS

| | | | |
|---|---|---|---|
| JP | 2006059106 A | * | 3/2006 |
| WO | WO-2006/017622 | | 2/2006 |

OTHER PUBLICATIONS

Jayesh Govindarajan and Matthew Ward "GeoViser—Geographic Visualization of Search Engine Results", Proceedings of the Tenth International Workshop on Database and Expert Systems Applications, 1999, Florence, Italy, Sep. 1, 1999, pp. 269-273.
PCT Search Report and Written Opinion for PCT/US2007/085128, dated Apr. 17, 2008, consists of 13 pages.

* cited by examiner

Primary Examiner — Redhwan k Mawari

(57) ABSTRACT

A method and apparatus for processing at least one information feed are disclosed. For example, the method receives at least one content via at least one automated feed. The method associates the at least one content to one or more geographical locations on a map, wherein the one or more geographical locations are determined from the at least one content. The method then presents an access to the at least one content to a user via the map.

10 Claims, 5 Drawing Sheets

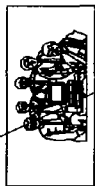
FIG. 2

US 8,645,055 B2

METHOD AND APPARATUS FOR PROVIDING GEOSPATIAL AND TEMPORAL NAVIGATION

This application claims the benefit of U.S. Provisional Application No. 60/860,243 filed on Nov. 20, 2006, which is herein incorporated by reference.

The present invention relates generally to dissemination of content and, more particularly, to a method and apparatus for enabling geospatial and temporal navigation via various automated feeds such as feeds from blog sites, edited content sites such as news paper sites, broadcast sites, and so on.

BACKGROUND OF THE INVENTION

Today's communications networks enable users to share content from any location via an Internet connection. For example, blogging has become a popular way to share content such as text, video, image, etc. Users may use various feeds such as Really Simple Syndication (RSS) or Atom feeds to receive content updates from various websites. RSS and Atom are syndicated Web feed formats based on the Extension Markup Language (XML) language. XML is a general purpose markup language published by the World Wide Web Consortium (W3C). In order to receive a RSS feed, a user may install a RSS reader program in his/her device. The user may then subscribe to a list of RSS feed websites via the RSS reader program. Many Web browsers can support RSS feeds so a separate RSS reader program would not be needed in this case because the capability is built into the Web browser. However, the number and variety of RSS feeds have been growing over time making the amount of information overwhelming. Locating relevant updates has become a labor intensive and time consuming process.

SUMMARY OF THE INVENTION

In one embodiment, the present invention discloses a method and apparatus for processing at least one information feed. For example, the method receives at least one content via at least one automated feed. The method associates the at least one content to one or more geographical locations on a map, wherein the one or more geographical locations are determined from the at least one content. The method then presents an access to the at least one content to a user via the map.

BRIEF DESCRIPTION OF THE DRAWINGS

The teaching of the present invention can be readily understood by considering the following detailed description in conjunction with the accompanying drawings, in which:

FIG. 2 illustrates an exemplary RSS feed with and without Geo-Tracker;

To facilitate understanding, identical reference numerals have been used, where possible, to designate identical elements that are common to the figures.

DETAILED DESCRIPTION

Figure 1:
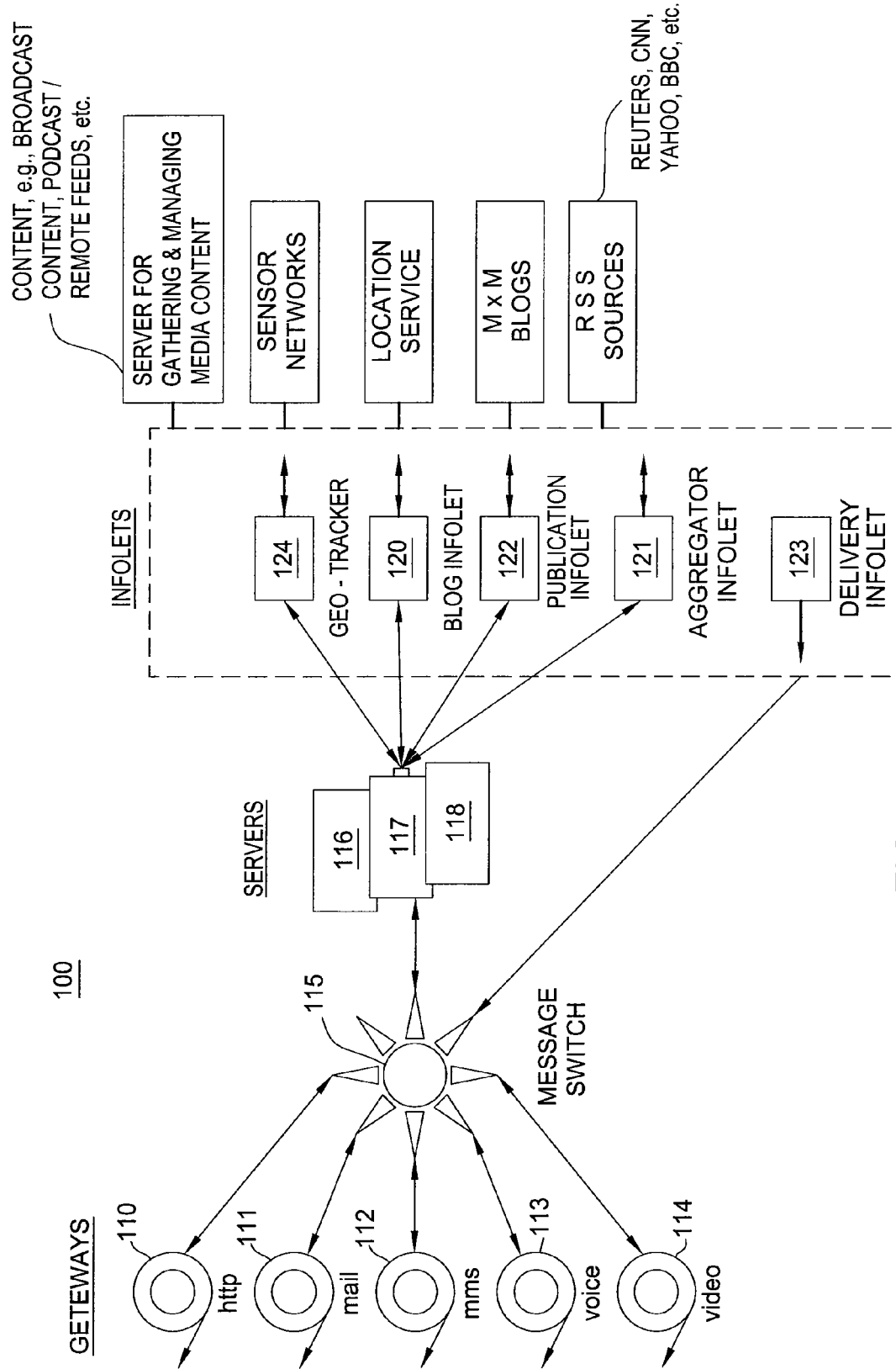
FIG. 1 illustrates an exemplary architecture diagram of the current invention for providing geospatial and temporal navigation.

The present invention broadly discloses a method and apparatus for enabling geospatial and temporal navigation via various automated feeds, e.g., feeds from blog sites, news paper sites, broadcast sites, etc. In one embodiment, these feeds are Really Simple Syndication (RSS) feeds. RSS is known as a family of Web feed formats used to publish frequently updated content such as blog entries, news headlines, podcasts and the like. An RSS document (which is broadly referred to as a "feed" or a "channel") may contain either a summary of the content from a web site or the full text. It should be noted that although the present invention is described illustratively in the context of RSS feeds, the present invention is not so limited. Namely, automated feeds in accordance with other standards can be employed in the present invention.

In the present invention, presenting or navigating the RSS data geospatially means that the data is presented over various locations on a geographical map, e.g., a world map, at a given point in time. In turn, presenting or navigating the RSS data temporally means that the data is presented over time at a particular location. In one embodiment of the present invention, a method and an apparatus for enabling both geospatial and temporal navigation via various automated feeds are presented.

It should be noted that although the present invention is disclosed below in the context of a world map, it should be noted that a geographical map of any size can be used. For example, the geographical map may comprise a continent, a region, a group of countries, a single country, a region of a country, a state, a province, a county, a city, a township and so on.

Using RSS feeds, websites are able to present their content to users in machine readable format. Rather than manually obtaining updates from various websites, the users may configure their RSS browser to automatically check for updates. Thus, such information feeds are broadly described as automated feeds.

The updates in machine readable format may also be presented in a summary format that displays headlines with individual items sorted by time. The presentation in such summary format is referred to as an aggregation process. The aggregation process can be performed by an aggregator software implemented in a computer or an application server. The aggregator software may subscribe to one or more feeds and automatically check for new contents and/or updates to existing contents at a pre-determined time interval. When new contents and/or updates are found, the aggregator is tasked with retrieving them. The aggregator may assemble all the content and converts non-RSS content (if any) to RSS format, for providing an aggregated RSS feed. The aggregator then disseminates the content to the users. Users may then receive the aggregated RSS feed and navigate to locate relevant updates. However, the number and variety of RSS feeds have been growing over time, making identification of relevant updates a time consuming and labor intensive process for the users.

In one embodiment, the current invention enables geospatial and/or temporal navigation of RSS feeds. Users may then locate relevant content and/or updates to content efficiently using the automated geospatial and temporal navigation.

FIG. 1 illustrates an exemplary architecture 100 of the current invention for providing geospatial and temporal navigation. The exemplary architecture 100 is used to process timely updates from various information sources and enable users to access the sources via geospatial and temporal navigation. The architecture 100 comprises of gateways that send and receive messages using different protocols and infolets to various information sources (e.g., websites, blog sites, etc.) and users. For instance, architecture 100 may comprise a Hypertext Transfer Protocol (HTTP) gateway 110, a mail gateway 111, a Multimedia Messaging Service (MMS) gateway 112, a voice gateway 113, a video gateway 114, a message switch 115, a plurality of servers 116-118, and various infolets 120-124.

In one embodiment, each of the infolets 120-124 may implement an application logic and may also provide access to one or more sources of information. The output of the infolets needs to conform to the destination delivery context established for the user session. For example, the blogger infolet 120 converts a blog entry submitted from any of the gateways 110-114 into an RSS feed. An RSS-enabled infolet 120-124 operating on each server 116-118, implements the relevant protocol interfaces to access various information sources (such as a location server, a presence server, and so on). Such an infolet may also implement a module to convert any retrieved non-RSS information into an RSS feed. This is accomplished in a timely manner making it amenable for aggregation with other sources of information, either from other infolets or from the personal blog entries submitted from various gateways.

In one embodiment, the RSS aggregator infolet 121 assembles all the RSS feeds. For example, feeds from RSS sources are aggregated with feeds from non-RSS sources by first converting the non-RSS feeds to RSS format. The RSS aggregator infolet 121 then provides a unique aggregated RSS feed. The RSS feed (assembled feed) is then ready for querying, filtering or publishing to other media gateways. The content may be adapted for delivery to subscribers who are interested in any event reported in the aggregated RSS feed.

In one embodiment, the publication infolet 122 is used to publish the personalized and filtered RSS content on a user's personal or group blog site maintained in a server in architecture 100. The delivery infolet 123 is used to adapt the content for delivery to the users' endpoint devices including, but not limited to, mobile devices, computers, and so on.

In one embodiment, the current invention provides geospatial and temporal navigation for RSS feeds using a Geo-Tracker infolet 124. The Geo-Tracker infolet 124 associates RSS content to one or more geographical locations on a geographical map, e.g., a world map, wherein said one or more geographical locations are mined from and/or inferred by the content. For example, if a news story is concerning the Israel-Lebanon conflict, the Geo-Tracker infolet may associate the story with the geographical locations of Israel and Lebanon. In another example, if a story is about two football teams from two different cities playing against each other, the Geo-Tracker infolet may associate the football story with the geographical location of the two cities.

In one embodiment, the current invention utilizes a location database having a plurality of geographical locations, e.g., continents, regions, countries, cities, provinces, counties, capitals, most important cities in each country, townships, etc. Furthermore, each of the geographical locations can be mapped to a coordinate system for identifying each geographical location on a world map, e.g., where the coordinate system may contain one or more of: a latitudinal parameter, a longitudinal parameter, and/or an altitude parameter.

In one embodiment, one or more geographical locations are mined from the content by extracting proper names from the textual content. For example, names such as France, New York, etc. may be extracted from the textual content. For example, proper names may be identified by creating tokens for the text, identifying a set of capitalized words separated by certain predefined characters (e.g., spaces), and/or eliminating words that commonly appear capitalized (e.g., The). For example, if the extracted text is:

"The United States soccer team is undefeated. The winning streak of 12 games continues. Perhaps, a few players will have to retire before anyone else wins . . . "

The capitalized portion (i.e., The United States) is first extracted from the textual content. Subsequently, the term "The" is removed as it is a commonly capitalized word, leaving "United States" as the only geographical location to be associated with the extracted text.

It should be noted that the one or more geographical locations can be directly obtained without being associated with an extracted name. For example, instead of extracting and using the term "The Empire State Building" in conjunction with a location database, the content may actually contain a street address or coordinates (e.g., latitude and longitude) for the term "The Empire State Building". If such information is available, the mapping can be made directly using the street address and/or coordinates.

In one embodiment, one or more geographical locations are inferred from the textual content. In other words, the identified location is not specifically identified in the textual content, but instead is simply inferred using one or more different rules or guidelines. For example, a location may have multiple acceptable names (e.g., USA, U.S. are associated with United States; "Garden State" is associated with New Jersey; "Empire State" is associated with New York; "Keystone State" is associated with Pennsylvania; and so on), where each of the acceptable names can be associated with a particular location.

In another example, a small city name may not be in the location database and the closest available location may be used. For example, the location of the capital of a country may be used to replace unknown city names in the country. However, if specific matches are found, then "inferred" matches can be avoided. For example, if the city name "Lyon" (located in France) is found, then the inferred location, e.g., the country of France, should be avoided.

In one embodiment, the one or more geographical locations can be inferred from other types of content, e.g., closed captioning from video broadcasts, audio podcasts that are passed through an automatic speech recognizer, calendar info, blogs, etc. Namely, the one or more geographical locations can be inferred from other content (e.g., non RSS content) that may be associated with the RSS feed.

In one embodiment, the method then presents the RSS content to one or more users with geographical and/or temporal navigation. For the example above, a user may first read a story about a football game between two cities. A user may then be interested in other stories about one of the teams, e.g., what other games the team might have played, current rankings, what cities the team might have played in, etc. The user may then navigate using the geographical and/or temporal information.

FIG. 2 illustrates how RSS feeds can be handled, e.g., an RSS feed that is used in conjunction with a Geo-Tracker and an RSS feed that is not used with a Geo-Tracker of the present invention. For example, the RSS feed is associated with a website, e.g., Yahoo! top stories. An RSS feed reader 201 that renders the Yahoo top stories RSS feed without the Geo-Tracker may simply provide one or more links that can then be accessed to display the various full stories in view 203. It should be noted that the Yahoo Website of Yahoo! Inc. of Sunnyvale, Calif., is only provided as an example and should not be interpreted as a limitation of the present invention.

However, the Geo-Tracker view 202 of RSS feeds including the Yahoo top stories RSS feed may present links 204 to be used by a user to navigate and access the various full stories in view 203. Unlike RSS feed reader 201, the links in the Geo-Tracker view 202 are presented illustratively in a "bubble" only when a pin is selected (e.g., "clicked on" or "highlighted" via a pointing device such as a mouse). More specifically, stories or topics in the Geo-Tracker view 202 used with the Geo-Tracker are associated with geographical locations as mentioned in the story (e.g., Lebanon, Jerusalem, Israel) such that pins are placed on one or more of these identified locations on a world map 220. For example, symbols 205-207 identify geographical locations associated with the relevant story or stories. Additional discussion pertaining to how RSS feed data will be presented on the geographical map will be further discussed below with reference to FIG. 3.

In one embodiment, the current method also provides links to one or more audio clips 208, image snapshots 209, video clips 210 and/or URLs 211 for a MediaRSS feed. In one embodiment, the method provides symbols 208-211 next to each of the links for indicating availability of one or more audio clips, image snapshots, video clips and/or URLs for each story or topic in the MediaRSS feed. For the example in FIG. 2, symbols 208-211 are used to provide access to the audio clips, image snapshots, video clips and/or URLs for a MediaRSS feed. For example, an audio clip will be played when an audio clip symbol or icon next to a story is accessed. In another example, a video clip will be played when a video clip symbol or icon next to a story is accessed.

Figure 3:
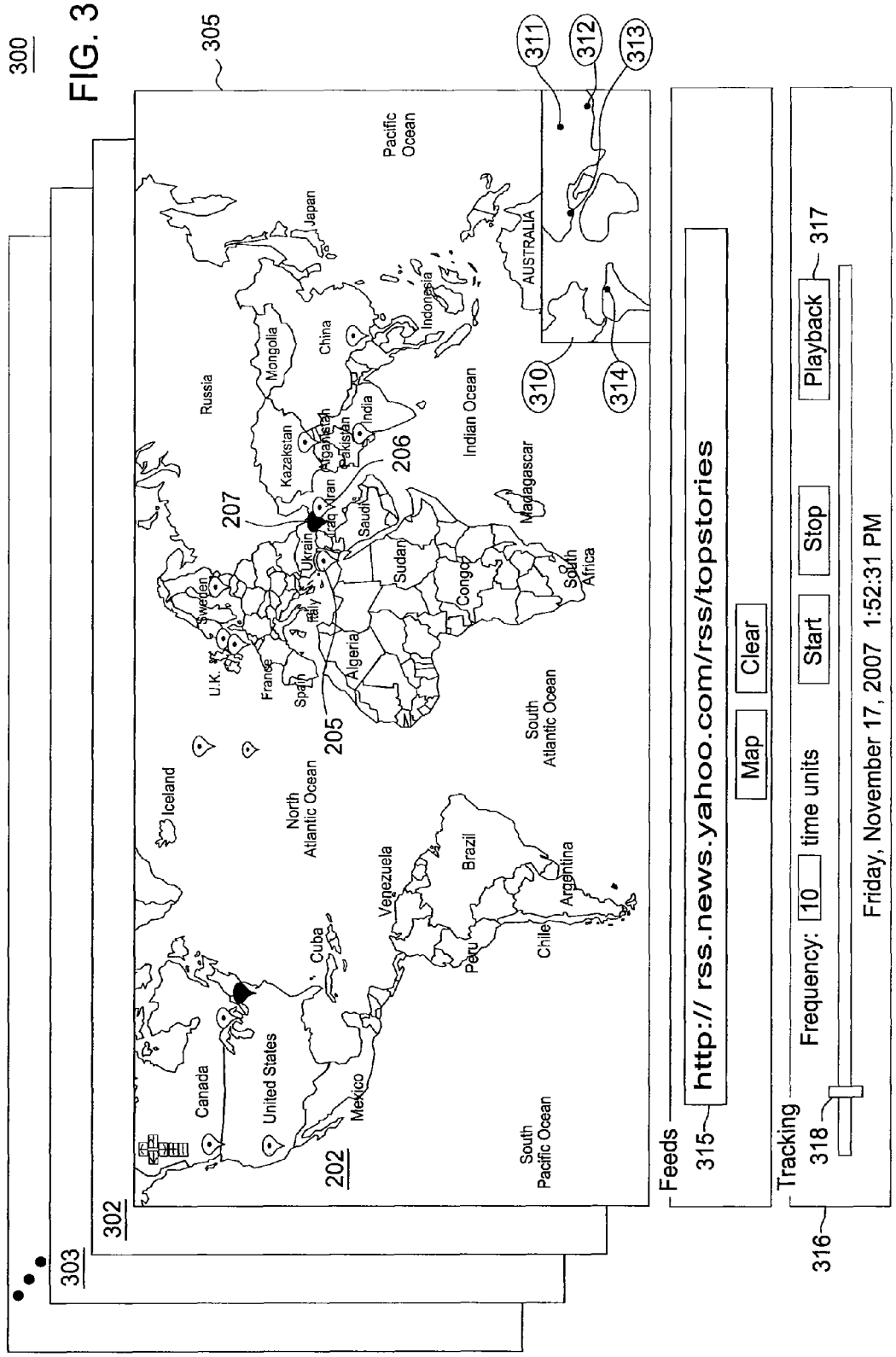
FIG. 3 illustrates geospatial and temporal navigation for RSS feeds with Geo-Tracker.

FIG. 3 illustrates an embodiment of geospatial and/or temporal navigation for automated information feeds, e.g., RSS feeds, when used with the Geo-Tracker. For example, one or more feeds 315 can be tracked on a world map 305 over time. For example, as mentioned earlier, the symbols 205-207 may identify geographical locations associated with one or more stories at a specific time. As the story or event evolves over time, it is possible that additional locations associated with the one or more stories are identified and added onto the world map. This allows a user to see how a story is evolving over a period of time. Namely, the user may identify hotspots for the story by looking at the world map at different times. For example, the color of the pin may change color to reflect intensity of a particular event happening at a particular location or an accumulation of different events in the same locations, e.g., changing from a green colored pin to a red colored pin, and so on. It should be noted that various methods of presenting intensity of an event can be employed and is not limited to the use of color on the pins, e.g., using different types of symbols or pins to reflect the intensity, using different audible tones, coloring the geographic areas on the map instead of just the pins, and so on.

For example, if a story is about an outbreak of an infectious disease, news coverage may initially focus on the limited affected areas such that only a few symbols or pins are identified on the world map 305. However, if the outbreak intensifies in the affected areas and/or extends outside of the initial identified areas, then more and more stories are generated that will focus on this particular topic, thereby indicating an increased interest around the world. In turn, the number of symbols or pins may be added on the world map 305 and/or a symbol or a pin color will be changed to reflect the intensity. It should be noted that "intensity" can be selectively defined by the user, e.g., intensity may represent the number of events or stories happening at a particular location, or intensity may represent the number of events or stories related to one or more keywords or terms, e.g., "Hurricane Katrina", "Iraq War", Bird Flu", and so on.

It should be noted that in one embodiment, the links that are illustrated in the bubble that is associated with each pin is also updated temporally. For example, a more recent story as provided by the automated feed for a particular geographic location may replace an older story for the same geographic location. To illustrate, a story published on Monday that caused a pin to be placed at a particular location may be replaced by another story published later on Friday for the same location. This allows the latest story to be presented to the user.

Alternatively, the latest story can simply be added or appended to the bubble and time stamped to show that this story is more recent than other stories that are listed in the bubble. For example, the story published on Friday will be listed first in the bubble followed by the story published on Monday. It should be noted that it may be necessary to store, e.g., locally, some of the older stories depending on the time duration that is selected by the user for temporal tracking. Namely, if the source of the automated feed is not saving such stories beyond the time period selected by the user, then it may be necessary to store the older stories locally.

In one embodiment, the method also provides one or more Picture-In-Picture (PIP) displays with story locations to give users a quick overview of other areas affected by a particular story. For example, a PIP display 310 may show locations 311-314 that are affected by or associated with a particular story. For example, if you are accessing a pin on the main map 305, the PIP display may quickly highlight the various geographic locations that may be discussed in the story. For example, a story having a pin placed on China in the main map 305 may discuss the Olympic Games that will be played in China. The story may also mention the countries of Brazil, France and Russia. If so, when the pin is accessed, the PIP display will show symbols on Brazil, France and Russia to indicate that the story relates to these geographic locations as well.

In one embodiment, the current invention also enables a user to specify the frequency of tracking RSS feeds over time. For example, a tracking window or interface 316 provides an example where a frequency of 10 time units has been specified. The time unit may be minutes, hours, days, weeks, months, etc. Thus, the geographical map at a time 202 will illustrate pins that have been aggregated over a predefined time period. It should be noted that over that selected time period, pins could be added and/or removed based on parameters selected by the user. As such, the geographical maps at a time 302, 303 and so on, will show different aggregations over different time periods.

Furthermore, a playback button 317 can be provided that allows a user to playback how the pins are populated onto the map, thereby allowing the user to get a sense how the pins were created over time. Alternatively, applying the playback button may cause the presentation of a series of maps, e.g., for each time instance over the selected period of time, as to what the map looks like at each instance in time.

Alternatively, a slider bar 318 can be employed to allow a user to selectively move the slider bar to a particular point in time to see how the pins are populated onto the map. For example, moving the slider bar from left to right may correspond to selecting a view of the map starting from an earlier time to a later time based upon the selected time period.

It should be noted that the present invention allows for a user to specify a particular search or query, e.g., a particular topic, a particular story, a particular term, and so on. For example, a user may define that he or she is interested only in stories pertaining to the commodity of "crude oil". As such, only stories pertaining to crude oil will be extracted from the one or more RSS feeds and displayed on the map 305. This feature can be implemented locally as a filtering function in the present invention or, alternatively, as a remote filtering function if offered by the source of automated feed. It should be noted that various search parameters can be defined by the user to address the interest of the user.

Figure 4:
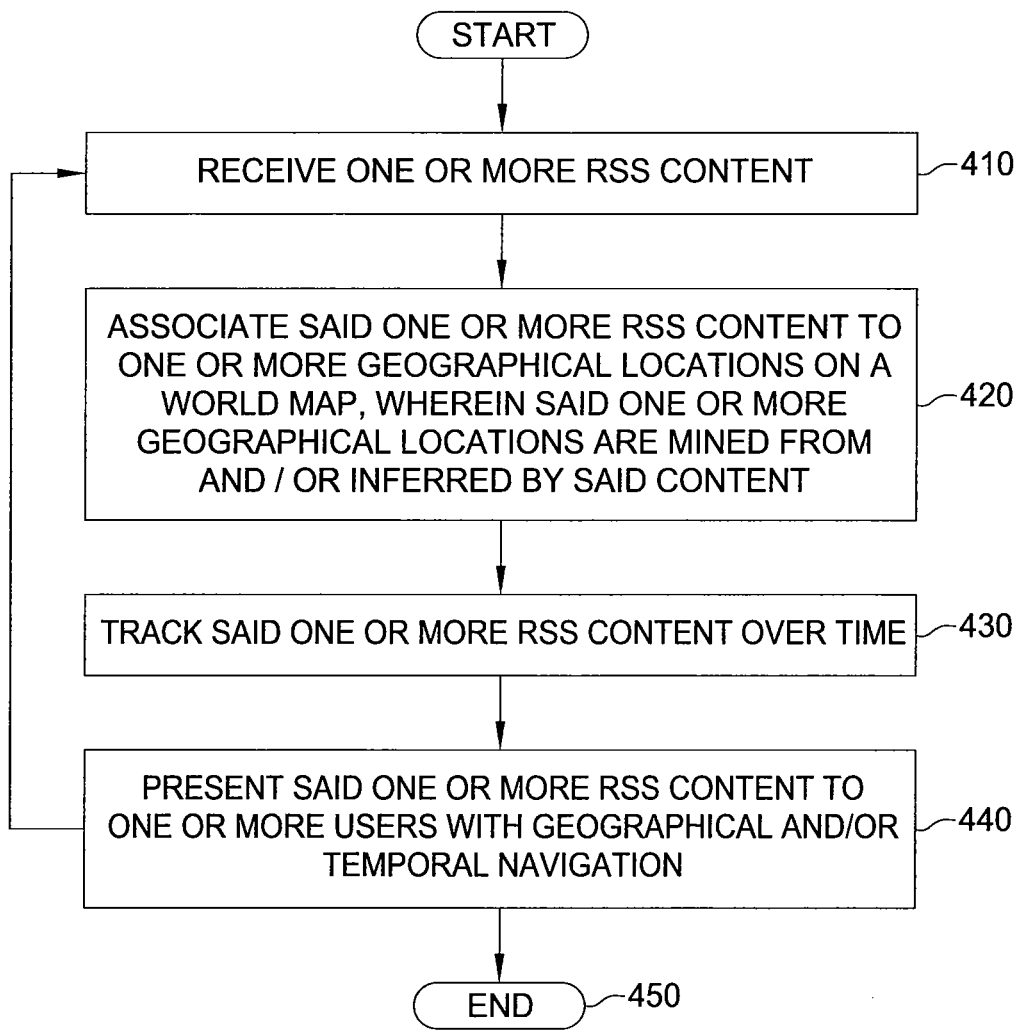
FIG. 4 illustrates a flowchart of a method for providing geospatial and temporal navigation.

FIG. 4 illustrates a flowchart of a method 400 for providing geospatial and/or temporal navigation. Method 400 starts in step 405 and proceeds to step 410.

In step 410, method 400 receives one or more content, e.g., RSS content, from one or more automated information feeds, e.g., RSS feeds. For example, method 400 receives one or more automated feeds from various source locations, e.g., yahoo news, broadcast news, etc.

In step 420, method 400 associates the one or more RSS content to one or more geographical locations on a world map, wherein the one or more geographical locations are mined from and/or inferred by the content. For example, the method may extract or infer names of geographical locations (e.g., countries, cities, etc.) from the text mined from the above information feeds. Using the extracted names, the method may access a location database containing geographical locations and their respective coordinates, e.g., latitudinal, longitudinal and/or latitudinal coordinates. The method is then able to associate the RSS content to locations on a world map using the coordinates.

In step 430, method 400 may optionally track the one or more RSS content over a predefined time period. For example, the method may receive updates automatically from the feeds in a predetermined schedule and track the content over time. For example, a story about a football team may be available at a particular time. As time progresses and the football team advances towards the championship, there may be more coverage of the team, e.g., more stories about players, backgrounds of teams, etc. A user may wish to view a particular content as it is tracked over time. More specifically, the present invention is able to track temporally one or more content (e.g., a story line, one or more keywords, and the like), to track one or more automated feeds, and/or to track one or more geographic locations on the map (e.g., all stories associated with Washington D.C. from one or more feeds, and so on).

In step 440, method 400 presents the one or more RSS content to one or more users with geographical and/or temporal navigation, e.g., via a display. For example, the method presents a list of contents along with a map with geographical locations mentioned in the content indicated on the map. For example, if the content is about a soccer game match between a New York team and a New Jersey team, the geographical locations of New York and New Jersey can be indicated on the map via the use of pins. The method then proceeds to step 450 to end processing the current feed or to step 410 to continue receiving more feeds.

In one embodiment, the method may also provide application specific knowledge modules for matching names to locations. For example, a sports module may be used to match player and coach names to the locations of the sports clubs, countries for which the players are playing, etc. For example, the baseball player named "Derek Jeter" can be matched with the state of New York, or the city of New York City, or the borough of Bronx, and so on.

In another example, a politics module may be used to match official titles (e.g., President, Minister, etc.) to locations. For example, "Governor Corzine" can be matched with the state of New Jersey or the city of Trenton, and so on.

In one embodiment, the current method may obtain a user's interest and personalize a user's browsing or viewing experience by highlighting events and presenting associated items that match the user's geographical interest. For example, if a viewer is interested in events in Washington D.C., the present invention will display stories that mention Washington.

It should be noted that although not specifically specified, one or more steps of method 400 may include a storing, displaying and/or outputting step as required for a particular application. In other words, any data, records, fields, and/or intermediate results discussed in the method 400 can be stored, displayed and/or outputted to another device as required for a particular application. Furthermore, steps or blocks in FIG. 4 that recite a determining operation, or involve a decision, do not necessarily require that both branches of the determining operation be practiced. In other words, one of the branches of the determining operation can be deemed as an optional step.

Figure 5:
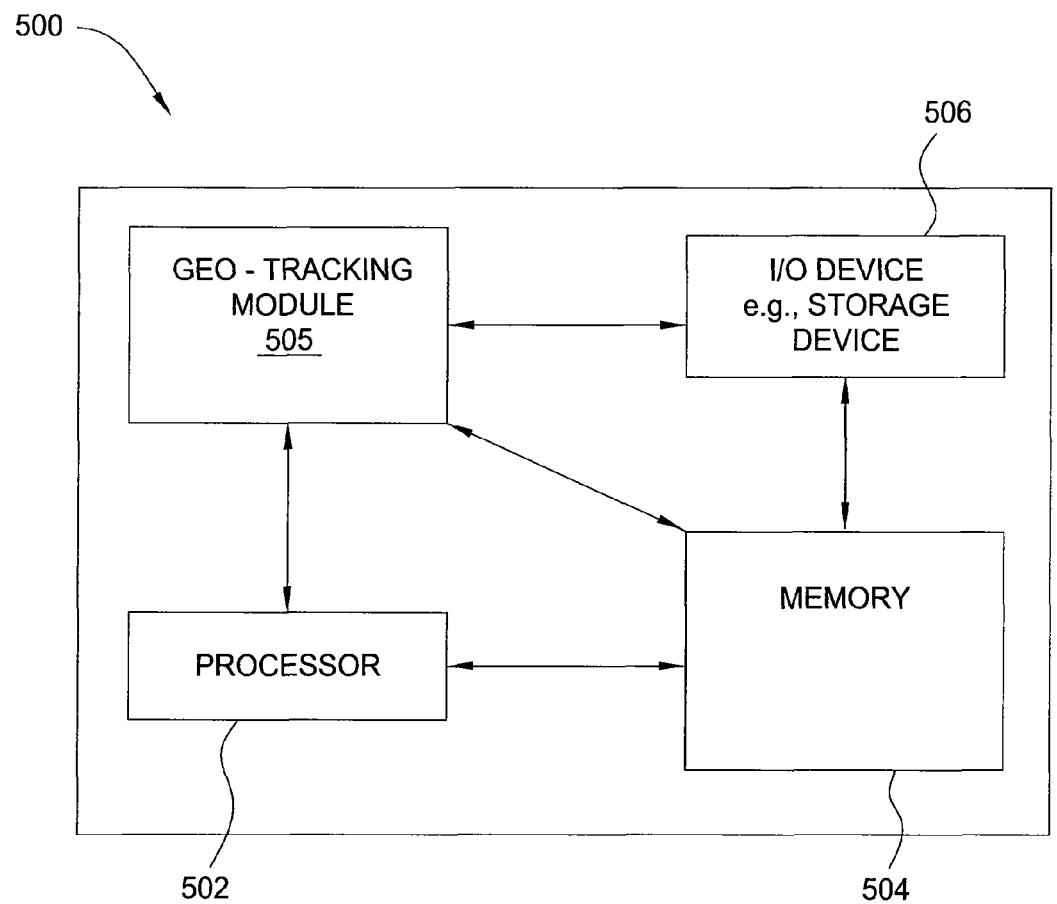
FIG. 5 illustrates a high level block diagram of a general purpose computer suitable for use in performing the functions described herein.

FIG. 5 depicts a high level block diagram of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for providing geospatial and/or temporal navigation, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 505 for providing geospatial and/or temporal navigation can be loaded into memory 504 and executed by processor 502 to implement the functions as discussed above. As such, the present process 505 for providing geospatial and/or temporal navigation (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for processing an automated feed, comprising:
receiving, by a processor, a content via the automated feed, wherein the automated feed comprises a really simple syndication feed;
associating, by the processor, the content to a plurality of geographical locations on a map, wherein the plurality of geographical locations is mined from a textual content of the content;
presenting, by the processor, an access to the content to a user via the map, wherein the access to the content is presented as a plurality of symbols on the map, wherein accessing one of the plurality of symbols on the map causes a link to the content to be displayed, wherein the accessing the one of the plurality of symbols on the map further displays a second symbol for accessing a universal resource locator; and providing on the map, by the processor, an indication of intensity of frequency associated with the content, wherein the intensity of frequency associated with the content comprises an intensity of a number of events associated with one of the plurality of geographical locations.

2. The method of claim 1, wherein one of the plurality of geographical locations comprises a city.

3. The method of claim 1, wherein one of the plurality of geographical locations is associated with a coordinate system comprising a latitudinal parameter and a longitudinal parameter.

4. The method of claim 1, wherein the map comprises a picture-in-picture display, where accessing one of the plurality of symbols on the map causes a geographic location to be displayed in the picture-in-picture display.

5. The method of claim 1, wherein the content is tracked temporally over a period of time.

6. The method of claim 1, wherein the plurality of geographical locations is determined directly from the content.

7. A non-transitory computer-readable medium storing instructions which, when executed by a processor, cause the processor to perform operations for processing an automated feed, the operations comprising:

receiving a content via the automated feed, wherein the automated feed comprises a really simple syndication feed;

associating the content to a plurality of geographical locations on a map, wherein the plurality of geographical locations is mined from a textual content of the content;

presenting an access to the content to a user via the map, wherein the access to the content is presented as a plurality of symbols on the map, wherein accessing one of the plurality of symbols on the map causes a link to the content to be displayed, wherein the accessing the one of the plurality of symbols on the map further displays a second symbol for accessing a universal resource locator; and providing on the map an indication of intensity of frequency associated with the content, wherein the intensity of frequency associated with the content comprises an intensity of a number of events associated with one of the plurality of geographical locations.

8. The non-transitory computer-readable medium of claim 7, wherein one of the plurality of geographical locations is associated with a coordinate system comprising a latitudinal parameter and a longitudinal parameter.

9. The non-transitory computer-readable medium of claim 7, wherein the content is tracked temporally over a period of time.

10. An apparatus for processing an automated feed, comprising:

a processor; and a computer-readable medium storing instructions which, when executed by the processor, cause the processor to perform operations, the operations comprising:

receiving a content via the automated feed, wherein the automated feed comprises a really simple syndication feed;

associating the content to a plurality of geographical locations on a map, wherein the plurality of geographical locations is mined from a textual content of the content;

presenting an access to the content to a user via the map, wherein the access to the content is presented as a plurality of symbols on the map, wherein accessing one of the plurality of symbols on the map causes a link to the content to be displayed, wherein the accessing the one of the plurality of symbols on the map further displays a second symbol for accessing a universal resource locator; and providing on the map an indication of intensity of frequency associated with the content, wherein the intensity of frequency associated with the content comprises an intensity of a number of events associated with one of the plurality of geographical locations.

* * * * *